(12) United States Patent
Belpanno et al.

(10) Patent No.: US 7,402,927 B2
(45) Date of Patent: Jul. 22, 2008

(54) QUICK-CHANGE BEARING ASSEMBLY THAT OBVIATES THE NEED TO RECENTER REPLACEMENT SPINDLES

(75) Inventors: Sandro G. Belpanno, Rochester, NY (US); James Hugick, Rochester, NY (US); Kurt Woodams, Oakfield, NY (US)

(73) Assignee: Brinkman Products, Inc., Rochester, NY (US)

( * ) Notice: Subject to any disclaimer, the term of this patent is extended or adjusted under 35 U.S.C. 154(b) by 367 days.

(21) Appl. No.: 11/335,129

(22) Filed: Jan. 19, 2006

(65) Prior Publication Data

US 2007/0165973 A1 Jul. 19, 2007

(51) Int. Cl.
*H02K 5/16* (2006.01)
(52) U.S. Cl. ........................ 310/90; 310/67 R
(58) Field of Classification Search ............... 310/37 R, 310/90; 384/113, 276
See application file for complete search history.

(56) References Cited

U.S. PATENT DOCUMENTS

| | | | | |
|---|---|---|---|---|
| 6,307,291 B1 * | 10/2001 | Iwaki et al. | ............. | 310/90 |
| 6,315,452 B1 * | 11/2001 | Titcomb | ............. | 384/114 |
| 6,567,268 B1 * | 5/2003 | Hsieh | ............. | 361/695 |
| 6,815,850 B2 * | 11/2004 | Albrecht et al. | ............. | 310/67 R |
| 6,841,907 B2 * | 1/2005 | Kull | ............. | 310/90 |
| 7,088,023 B1 * | 8/2006 | Gomyo et al. | ............. | 310/90 |
| 7,176,596 B2 * | 2/2007 | Hong et al. | ............. | 310/90 |
| 7,342,336 B1 * | 3/2008 | Horng et al. | ............. | 310/90 |
| 2004/0174078 A1* | 9/2004 | Kull | ............. | 310/90 |
| 2006/0087184 A1* | 4/2006 | Kuyama et al. | ............. | 310/90 |
| 2007/0013246 A1* | 1/2007 | Hong et al. | ............. | 310/90 |

* cited by examiner

*Primary Examiner*—Thanh Lam
(74) *Attorney, Agent, or Firm*—Phillips Lytle LLP

(57) ABSTRACT

The present invention provides an improvement for use in a machine tool having a spindle (51) mounted in a body opening (30) for axial and rotative movement relative to a body (31). The improvement includes a bearing assembly (25) that permits spindles (S1, S2, S3, . . . ) to be quickly exchanged while obviating the need to recenter a replacement spindle with respect to the opening after the original spindle has been initially center therein. The improved bearing assembly (25) broadly includes: a ferrous tubular sleeve (29) mounted in the body opening, the sleeve having an outer surface (40) arranged to face toward a portion (31) of the body that surrounds the opening and having an inner surface (36, 39) arranged to face toward a penetrant portion of the spindle; and a tubular bearing (46) arranged within the sleeve, the tubular bearing having an outer surface (51) arranged to face the sleeve inner surface and having an inner surface (50) arranged to face the spindle penetrant portion.

17 Claims, 3 Drawing Sheets

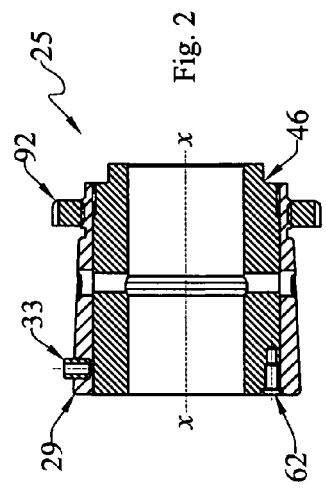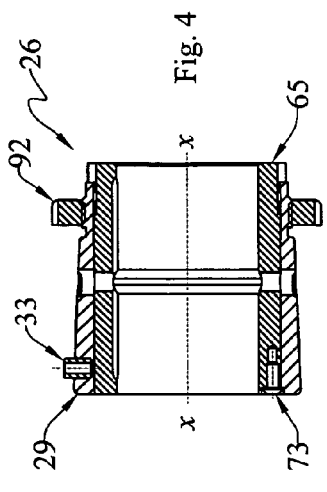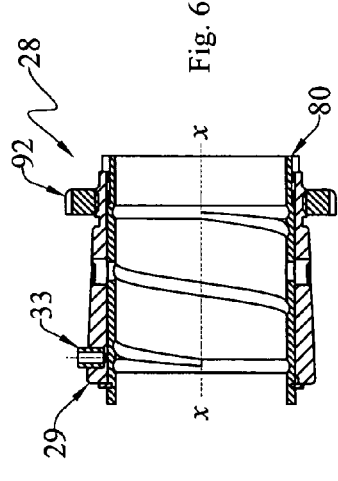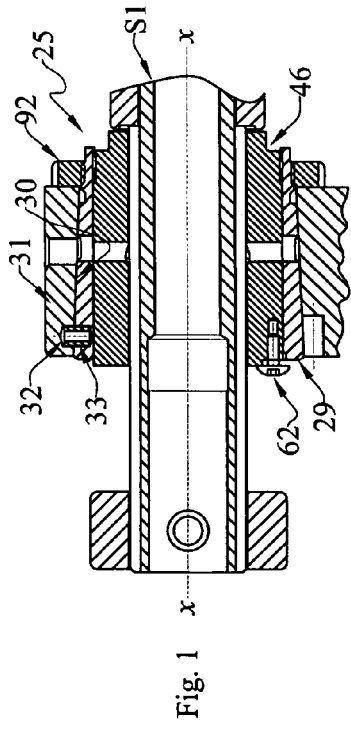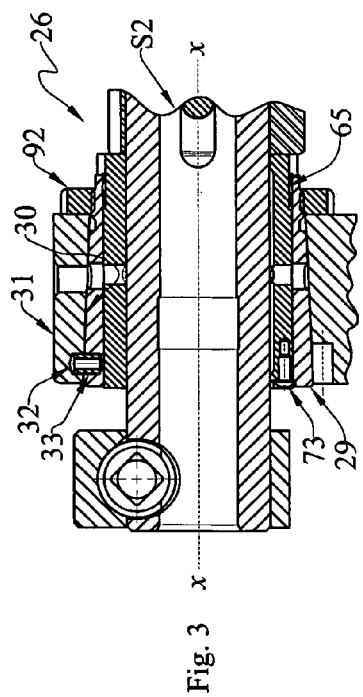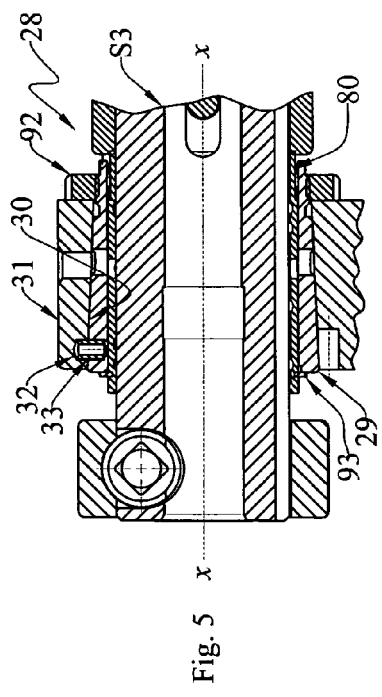

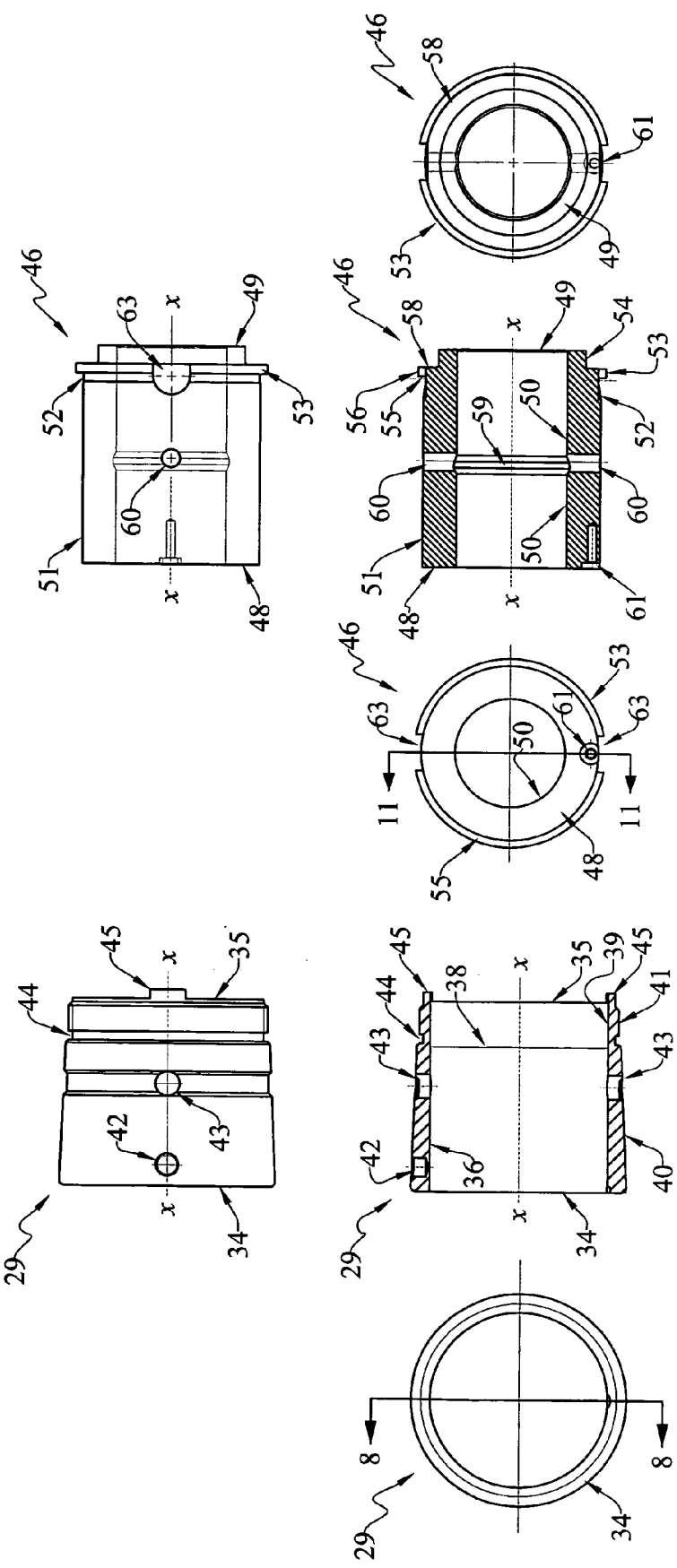

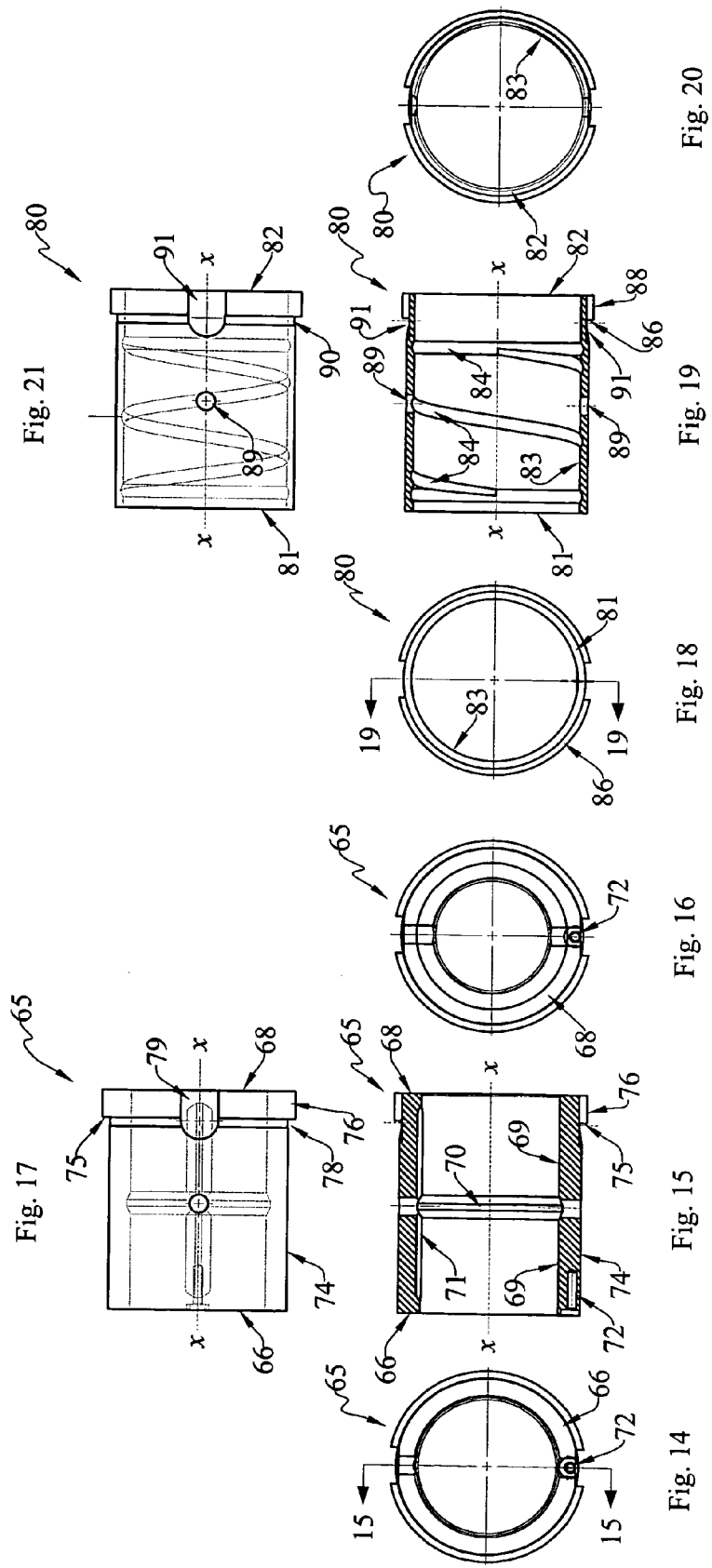

US 7,402,927 B2

QUICK-CHANGE BEARING ASSEMBLY THAT OBVIATES THE NEED TO RECENTER REPLACEMENT SPINDLES

TECHNICAL FIELD

The present invention relates generally to bearings for mounting spindles on machine tools, and, more particularly, to an improved quick-change bearing assembly that obviates the need to recenter replacement spindles.

BACKGROUND ART

In certain machine tools, such as automatic screw machines, a spindle is mounted for rotation relative to a body or head.

When initially mounted on the head, the spindle must be centered with respect to the head. To do this, shims are traditionally added where needed, to center the axis of the spindle with respect to the axis of the head or body opening.

However, with prior art arrangements, each time the spindle is removed or replaced, the reinstalled or replacement spindle must be recentered with respect to the body opening.

Accordingly, it would be generally desirable to provide a quick-change bearing assembly that will allow spindles to be quickly and easily removed, replaced and exchanged, and that will obviate the need to recenter a reinstalled or replacement spindle after the original spindle has been centered.

DISCLOSURE OF THE INVENTION

With parenthetical reference to the corresponding parts, portions or surfaces of the disclosed embodiment, merely for purposes of illustration and not by way of limitation, the present invention broadly provides an improved bearing assembly for use in a machine tool having a spindle mounted in a body opening for movement relative to the body.

The improved bearing assembly permits spindles to be quickly exchanged and obviates the need to recenter a replacement spindle (S1, S2, S3, . . . ) with respect to the opening after the original spindle has been initially centered therein. As used herein, a replacement spindle is a spindle that is to be installed after a previous spindle has been removed. Thus, the replacement spindle may be a reinstallation of the same spindle that had been removed, or maybe a new spindle.

The improved bearing assembly (25) includes: a tubular sleeve (29) of a ferrous metal mounted in the body opening (30), the sleeve having an outer surface (40) arranged to face toward the portion of the body that surrounds the opening and having an inner surface (36, 39) arranged to face toward a penetrant portion of a spindle; and a tubular bearing (46) arranged within the sleeve, the tubular bearing having an outer surface (51) arranged to face the sleeve inner surface (36, 39) and having an inner surface (50) arranged to face the spindle penetrant portion.

The tubular bearing inner surface is arranged to slidably engage the spindle penetrant portion.

In the preferred embodiment, the sleeve inner surface (36, 39) is cylindrical, and a portion (40) of the sleeve outer surface is frusto-conical.

The tubular bearing is preferably formed of bronze.

The spindle is desirably mounted in the body opening for rotational and axial movement relative to the body.

The improvement may further include: a pin (33) engaging the body and the tubular sleeve to prevent relative movement therebetween. To this purpose, the body may be provided with a blind hole (32) to receive one marginal end portion of the pin, and the tubular-sleeve may be provided with a blind hole (42) to receive the opposite marginal end portion of the pin.

In the preferred form, a groove (59 or 70, 71 or 84) extends into the tubular bearing from the inner surface thereof for distributing lubricant between the spindle and the bearing inner surface. This groove may extend into the bearing in a longitudinal direction (e.g., 71), a radial direction (e.g., 70), or the like. In one form, the groove (84) extends helically into the bearing.

The sleeve outer surface may have an portion (41) that is externally threaded, and the improvement may include a nut (92) arranged to matingly engage this sleeve externally-threaded portion The improvement may further include: a interlock mechanism (72, 73 or 93) acting between the sleeve and bearing to prevent relative movement therebetween in one direction. In one form, this interlock mechanism includes a tapped hole (61) arranged in one of the sleeve and bearing, and a headed fastener (62) threaded into the tapped hole and having a head portion engaging the other of the sleeve and bearing. In another form, the interlock mechanism includes an annular groove extending into one of the sleeve and bearing, and a retaining ring (93) having one portion received in the annular groove and having another portion engaging the other of the sleeve and bearing.

Accordingly, the invention broadly provides an improved bearing assembly that allows spindles to be quickly exchanged while obviating the need to recenter a replacement spindle after the original spindle has been initially centered therein.

Another object is to provide an improved bearing assembly that allows spindles of different shapes and configurations to be quickly and easily replaced and exchanged.

These and other objects and advantages will be come apparent from the foregoing and ongoing written specification, the drawings and the appended claims.

BRIEF DESCRIPTION OF THE DRAWINGS

FIG. 1 is a fragmentary longitudinal vertical sectional view of a first form of the improved bearing assembly in association with a first spindle.

FIG. 2 is a fragmentary longitudinal vertical sectional view of the bearing assembly shown in FIG. 1, with the first spindle removed.

FIG. 3 is a fragmentary longitudinal vertical sectional view of a second form of the improved bearing assembly in association with a second spindle.

FIG. 4 is a fragmentary longitudinal vertical sectional view of the bearing assembly shown in FIG. 3, with the second spindle removed.

FIG. 5 is a fragmentary longitudinal vertical sectional view of a third form of the improved bearing assembly in association with a third spindle.

FIG. 6 is a fragmentary longitudinal vertical sectional view of the bearing assembly shown in FIG. 5, with the third spindle removed.

FIG. 7 is a left end elevation of the ferrous tubular sleeve.

FIG. 8 is a fragmentary longitudinal vertical sectional view thereof, taken generally on line 8-8 of FIG. 7.

FIG. 9 is a top plan view of the ferrous tubular sleeve shown in FIGS. 7 and 8.

FIG. 10 is a left end elevation of a first form of the tubular bearing shown in FIG. 1.

FIG. 11 is a fragmentary longitudinal vertical sectional view thereof, taken generally on line 11-11 of FIG. 10.

FIG. 12 is a right end elevation of the tubular bearing shown in FIGS. 10 and 11.

FIG. 13 is a top plan view of the tubular bearing shown in FIGS. 10-12.

FIG. 14 is a left end elevation of the second form of the improved tubular bearing.

FIG. 15 is a fragmentary longitudinal vertical sectional view thereof, taken generally on line 15-15 of FIG. 14.

FIG. 16 is a right end elevation of the tubular bearing shown in FIG. 15.

FIG. 17 is a top plan view of the tubular bearing shown in FIGS. 14-16.

FIG. 18 is a left end elevation of a third form of the improved tubular bearing.

FIG. 19 is a fragmentary longitudinal vertical sectional view thereof, taken generally on line 19-19 of FIG. 18.

FIG. 20 is a right end elevation of the tubular bearing shown in FIG. 19.

FIG. 21 is a top plan view of the tubular bearing shown in FIG. 19.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1-6 thereof, the present invention broadly provides an improved bearing assembly that permits machine tool spindles to be quickly exchanged while obviating the need to recenter a replacement spindle with respect to a body opening after the original spindle has been initially centered therein.

A first form of the improved bearing assembly is generally indicated at 25 in FIGS. 1 and 2; a second form is generally indicated at 26 in FIGS. 3 and 4; and a third form is generally indicated at 28 in FIGS. 5-6. In each case, the bearing assembly includes a tubular sleeve, generally indicated at 29, formed of a ferrous metal and mounted in an opening 30 of a body 31. As best shown in FIGS. 1, 3 and 5, the body opening 30 includes an inwardly-and leftwardly-facing frusto-conical surface. Moreover, a blind hole 32 extends radially into the body from opening 30 to accommodate and receive one marginal end portion of a pin 33.

As best shown in FIGS. 7-9, the tubular sleeve 29 is a horizontally-elongated specially-configured tubular member having an annular vertical left end face 34, an annular vertical right end face 35, a stepped inner surface that sequentially includes an inwardly-facing horizontal cylindrical surface 36 extending rightwardly from left end face 34, a rightwardly-facing annular vertical shoulder-38, and an inwardly-facing horizontal cylindrical surface 39 continuing rightwardly therefrom to join right end face 35. The tubular sleeve is also shown as including an outer surface that includes (in pertinent part): an outwardly-and rightwardly-facing frusto-conical surface 40 extending rightwardly from the outer margin of left end face 34, and an externally-threaded portion 41 adjacent right end face 35. A blind hole 42 extends radially into the tubular sleeve to accommodate and receive the inner marginal end portion of pin 33. This pin is used to prevent relative movement, both axially and rotationally, of the tubular sleeve 29 relative to body 31.

Still referring to FIG. 8, a diametrical through-hole, indicated at 43, extends through an intermediate portion of the tubular sleeve. An annular groove, indicated at 44, extends into the tubular sleeve from its outer surface, and separates frusto-conical portion 40 from externally-threaded portion 41. The tubular sleeve is shown as having two diametrically-opposite tongues, severally indicated at 45, that extend axially beyond right end face 35. These two tongues 45, 45 constitute locating tabs, that are adapted to engage adjacent structure.

Adverting now to FIGS. 1 and 2, the first form of the improved bearing assembly is shown as including a tubular bearing, generally indicated at 46, arranged within sleeve 29.

As best shown in FIGS. 10-13, bearing 46 is shown as being a horizontally-elongated tubular member having an annular vertical left end face 48, an annular vertical right end face 49, an inwardly-facing horizontal cylindrical surface 50, and a stepped outer surface that sequentially includes: an outwardly-facing horizontal cylindrical surface 51 extending rightwardly from the outer margin of left end face 48, a shallow annular groove 52, a flange portion 53 extending outwardly beyond surface 51, and an outwardly-facing horizontal cylindrical surface 54 continuing rightwardly therefrom to join the outer margin of right end face 49. Flange 53 is defined by a leftwardly-facing annular vertical surface 55 extending outwardly from surface 51, an outwardly-facing horizontal cylindrical surface 56, and a rightwardly-facing annular vertical surface 58 extending inwardly therefrom and joining the left marginal end portion of surface 54.

A shallow annular groove, indicated at 59, extends into bearing 46 from an intermediate portion of inner surface 50, and is intersected by a diametrical through-hole 60. A tapped blind hole 61 extends horizontally into bearing 46 from the 6:00 o'clock position of its left end face to accommodate and receive a headed fastener, indicated at 62 in FIGS. 1 and 2. Fastener 62 is adapted to be matingly received in hole 61, and the head portion thereof is adapted to engage the left end face of the left end face 34 of the tubular sleeve to limit relative axial movement therebetween. As best shown in FIGS. 10 and 12, bearing flange 53 is provided with two diametrically-opposite slots, severally indicated at 63.

Adverting now to FIGS. 3 and 4, the second form 26 of the improved bearing assembly is shown as including ferrous tubular sleeve 29, and an alternative form of the tubular bearing, this form being generally indicated at 65.

As best shown in FIGS. 14-17, bearing 65 is a horizontally-elongated specially-configured tubular member having an annular vertical left end face 66, an annular vertical right end face 68, and an inwardly-facing horizontal cylindrical surface 69 extending therebetween. A shallow circumferential groove 70 extends radially into the bearing from an intermediate position of inner surface 69. A longitudinally-extending groove 71 extends radially into bearing 65, and intersects circumferential groove 70. Grooves 70 and 71 provide circumferentially-and axially-extending lubricant distribution grooves.

Here again, a tapped line hole 72 extends into bearing 65 from the 6:00 o'clock position of its left end face to accommodate and receive a headed fastener 73, which engages the left marginal end portion of the tubular sleeve to limit relative axial movement therebetween in one direction.

Bearing 65 is also shown as having an outer surface that sequentially includes an outwardly-facing horizontal cylindrical surface 74 extending rightwardly from the outer margin of left end face 66, a leftwardly-facing annular vertical surface 75, and a horizontal cylindrical surface 76 continuing rightwardly therefrom to join the outer margin of right end face 68. A shallow annular filleted groove 78 is provided between surfaces 74 and 75. A pair of diametrically-opposite inclined ramps, generally indicated at 79, extend rightwardly and slightly inwardly from surface 74, and join right end face 68.

Adverting now to FIGS. 5 and 6, the third form 28 of the improved bearing assembly is shown as including tubular sleeve 29 and a thin-walled tubular bearing, generally indicated at 80.

As best shown in FIG. 21, bearing 80 is a specially-configured horizontally-elongated member having an annular vertical left end face 81, a annular vertical right end face 82, and an inner cylindrical surface 83 extending therebetween. A plurality of helical grooves, portions of which are indicated at 84, extend into bearing 80 from its inner surface 83 to distribute lubricant therealong. Bearing 80 is shown as having an outer surface that includes, in pertinent part: a horizontal cylindrical surface 85 extending rightwardly from the outer margin of left end face 81, an leftwardly-facing annular vertical surface 86, and an outwardly-facing horizontal cylindrical surface 88 continuing rightwardly therefrom to join the outer margin of right end face 82. A diametrical hole 89 extends through an intermediate portion of bearing 80 and intersects lubricant-distributing spiral groove 84. A filleted annular groove 90 extends radially into bearing 80 between outer surfaces 85 and 86. A pair of inclined-diametrically-opposite flats, severally indicated at 91, extend rightwardly from surface 85.

All three forms of the improved bearing assembly use common tubular sleeve 29. However, the individual bearing assemblies differ in that the tubular bearing member differs for each bearing assembly. In each case, the tubular bearing is formed of bronze. In each case, after the bearing assembly has been initially mounted on the body, the bearing assembly may be disassembled, by unthreading nut 92, to allow the bearing assembly to be disassembled in situ. In other words, the outer tubular sleeve would remain mounted on the body in a centered position with respect to the body opening. Hence, the outer sleeve need only be initially shimmed to center its axis with respect to that of the opening. Thereafter, screws 62 (FIGS. 1-2), 73 (FIGS. 3-4), or retaining ring 93 (FIGS. 5-6) may be selectively removed to allow the bearing assembly to be disassembled by removing the tubular bearing from within the tubular sleeve. This will allow the spindle to be removed.

In FIGS. 1, 3 and 5, three different spindles indicated at S1, S2 and S3, respectively are depicted. A replacement spindle, whether the original spindle or another, may then be reinserted, and the bearing assembly reassembled without having to recenter the outer sleeve with respect to the body opening. Thus, the improved bearing assembly allows spindles to be quickly exchanged, while obviating the need to recenter the replacement spindles.

Modifications

The present invention contemplates that many changes and modifications may be made. For example, the materials of construction are not deemed to be critical, unless expressed in the claims, and may be readily changed or modified as desired. While it is presently preferred to use bronze as the material of the journal bearing, other types of journal bearing materials might possibly be used.

Therefore, while three preferred forms of the present invention have been shown and described, that several modifications thereof discussed, persons skilled in this art will readily appreciate that various additional changes and modifications may be made without departing from the spirit of the invention, as defined and differentiated by the following claims.

What is claimed is:

1. In a machine tool having a spindle mounted in a body opening for movement relative to said body, the improvement comprising:
   a bearing assembly that permits spindles to be quickly exchanged while obviating the need to recenter a replacement spindle with respect to said opening after the original spindle has been initially centered therein, said bearing assembly including:
   a tubular sleeve of a ferrous metal mounted in said body opening, said sleeve having an outer surface arranged to face toward the portion of said body that surrounds said opening and having an inner surface arranged to face toward a penetrant portion of a spindle; and
   a tubular bearing arranged within said sleeve, said tubular bearing having an outer surface arranged to face said sleeve inner surface and having an inner surface arranged to face said spindle penetrant portion.

2. The improvement as set forth in claim 1 wherein said tubular bearing inner surface is arranged to slidably engage said spindle penetrant portion.

3. The improvement as set forth in claim 2 wherein said sleeve inner surface is cylindrical.

4. The improvement as set forth in claim 1 wherein a portion of said sleeve outer surface is frusto-conical.

5. The improvement as set forth in claim 1 wherein said tubular bearing is formed of bronze.

6. The improvement as set forth in claim 5 wherein said spindle is mounted in said body opening for rotational and axial movement relative to said body.

7. The improvement as set forth in claim 1, and further comprising:
   a pin engaging said body and said tubular sleeve to prevent relative movement therebetween.

8. The improvement as set forth in claim 7 wherein said body is provided with a blind hole to receive one marginal end portion of said pin.

9. The improvement as set forth in claim 8 wherein said tubular sleeve is provided with a blind hole to receive the opposite marginal end portion of said pin.

10. The improvement as set forth in claim 1 wherein a groove extends into said tubular bearing from said inner surface thereof for distributing lubricant between said spindle and said bearing inner surface.

11. The improvement as set forth in claim 10 wherein said groove extends into said bearing in a longitudinal direction.

12. The improvement as set forth in claim 10 wherein said groove extends into said bearing in a radial direction.

13. The improvement as set forth in claim 10 wherein said groove extends helically into said bearing.

14. The improvement as set forth in claim 1 wherein a portion of said sleeve outer surface is externally threaded, and further comprising:
   a nut arranged to matingly engage said sleeve externally-threaded portion.

15. The improvement as set forth in claim 1 and further comprising:
   a interlock mechanism acting between said sleeve and bearing to prevent relative movement therebetween in one direction.

16. The improvement as set forth in claim 15 wherein said interlock mechanism includes a tapped hole arranged in one of said sleeve and bearing, and a headed fastener threaded into said tapped hole and having a head portion engaging the other of said sleeve and bearing.

17. The improvement as set forth in claim 15 wherein said interlock mechanism includes an annular groove extending into one of said sleeve and bearing, and a retaining ring having one portion received in said annular groove and having another portion engaging the other of said sleeve and bearing.

* * * * *